US009010051B2

(12) United States Patent
Mackintosh

(10) Patent No.: US 9,010,051 B2
(45) Date of Patent: Apr. 21, 2015

(54) MODULAR FIRE PREVENTION FLOORING

(71) Applicant: Fireless Flooring LLC, Houston, TX (US)

(72) Inventor: Tristan Willfried Mackintosh, Houston, TX (US)

(73) Assignee: Fireless Flooring LLC, Houston, TX (US)

(*) Notice: Subject to any disclaimer, the term of this patent is extended or adjusted under 35 U.S.C. 154(b) by 0 days.

(21) Appl. No.: 14/077,804

(22) Filed: Nov. 12, 2013

(65) Prior Publication Data
US 2014/0137487 A1     May 22, 2014

Related U.S. Application Data

(60) Provisional application No. 61/725,810, filed on Nov. 13, 2012.

(51) Int. Cl.
| E04F 17/00 | (2006.01) |
| E04B 1/94 | (2006.01) |
| E03F 5/04 | (2006.01) |
| E01C 9/10 | (2006.01) |
| E01F 3/00 | (2006.01) |
| E01C 9/00 | (2006.01) |
| B64F 1/00 | (2006.01) |

(52) U.S. Cl.
CPC . *E04B 1/941* (2013.01); *E03F 5/04* (2013.01); *E01C 9/10* (2013.01); *E01F 3/00* (2013.01); *E01C 9/008* (2013.01); *B64F 1/00* (2013.01); *B64F 1/007* (2013.01)

(58) Field of Classification Search
USPC ............. 52/168, 302.1, 302.3, 656.3, 783.13, 52/784.11; 119/450, 527, 529, 530; 108/24
See application file for complete search history.

(56) References Cited

U.S. PATENT DOCUMENTS

| 186,463 | A | | 1/1877 | Dickinson | |
| 2,454,583 | A | * | 11/1948 | Wisely | ............................ 52/667 |
| 4,048,960 | A | | 9/1977 | Barnidge et al. | |
| 4,231,325 | A | | 11/1980 | Parks | |
| 5,058,346 | A | | 10/1991 | Spaeth et al. | |
| 5,562,047 | A | | 10/1996 | Forney et al. | |
| 5,634,300 | A | * | 6/1997 | Huebner et al. | ............... 52/36.1 |
| 6,923,145 | B2 | | 8/2005 | Wahl | |
| 2009/0126294 | A1 | | 5/2009 | Lovald et al. | |

(Continued)

FOREIGN PATENT DOCUMENTS

CA     2647230 A1     6/2010

OTHER PUBLICATIONS

International Search Report and Written Opinion for International Application No. PCT/US13/69655, mailed on Apr. 14, 2014 (13 pages).

*Primary Examiner* — William Gilbert
(74) *Attorney, Agent, or Firm* — Adolph Locklar

(57) ABSTRACT

A modular fire prevention flooring system includes a plurality of fire prevention flooring planks. Each plank is generally tubular and forms a drain channel. Fluids spilled onto the upper surface of the flooring system may drain through a plurality of drain holes formed in the upper surface of the planks. The planks may further include a metal filler positioned within the drain channels to stop combustion of burning fluids spilled into the drain channels. The metal filler may break up burning liquids and remove heat therefrom. In some embodiments, a purging fluid may be flowed through the planks to purge any spilled fluids therefrom.

33 Claims, 13 Drawing Sheets

(56) References Cited

U.S. PATENT DOCUMENTS

2010/0083608 A1* 4/2010 Moller, Jr. .................... 52/716.1

2011/0277394 A1* 11/2011 Chich et al. ...................... 52/95
2012/0110827 A1 5/2012 Doolittle et al.

* cited by examiner

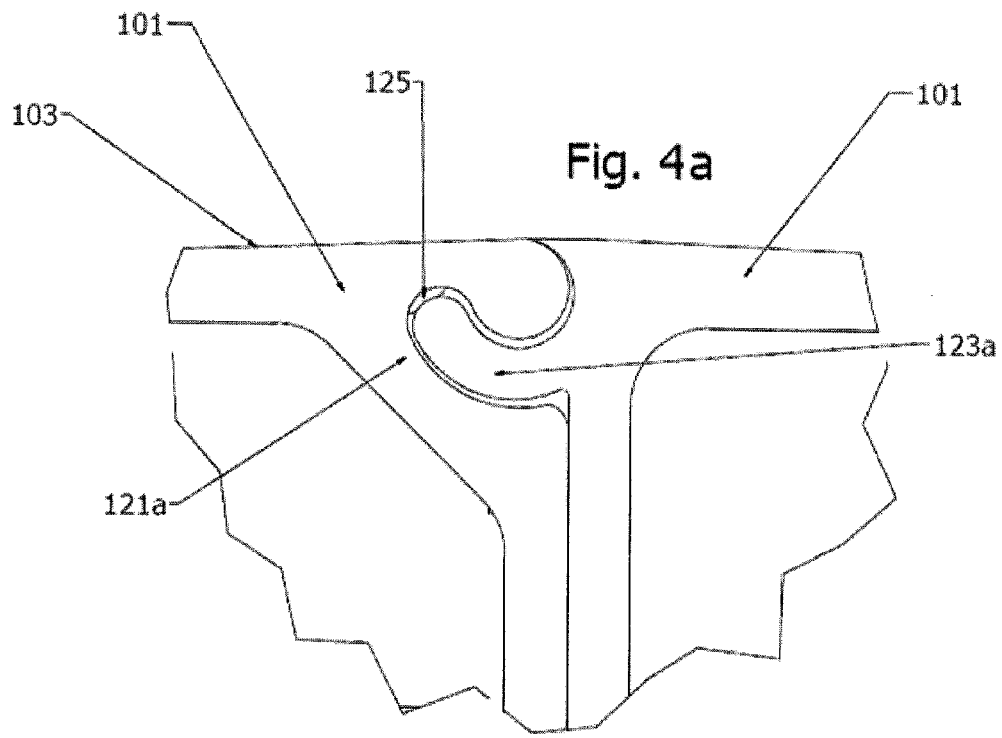
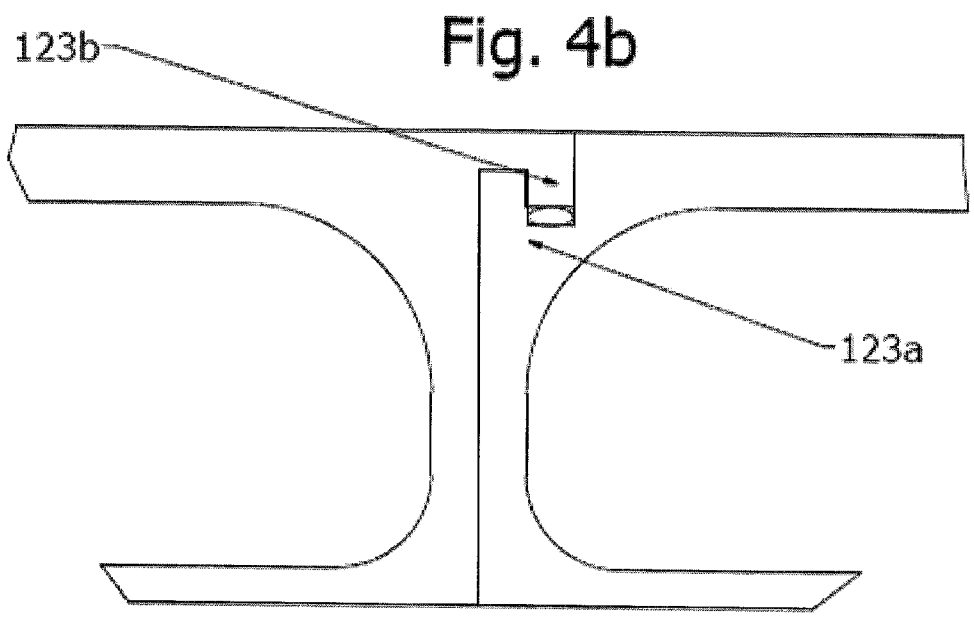

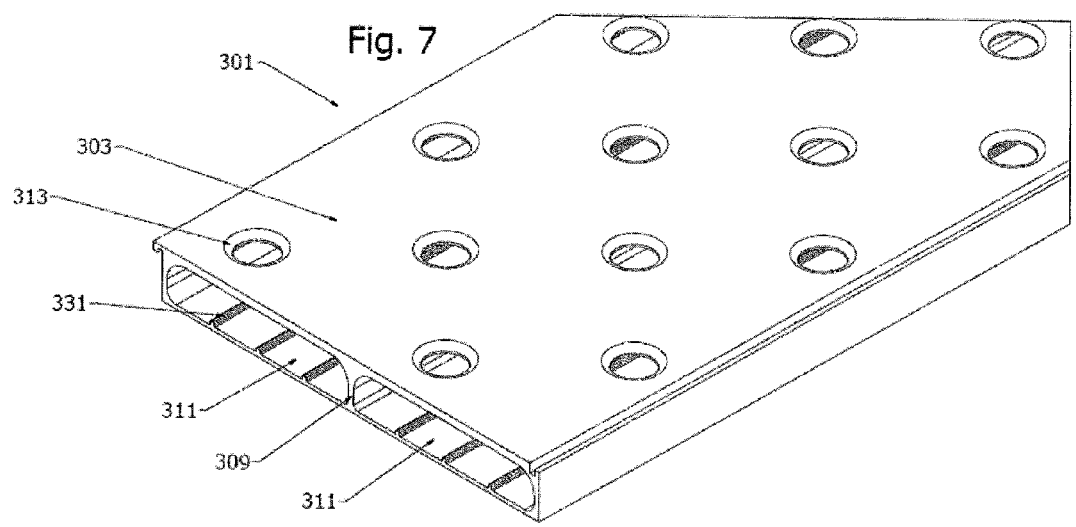
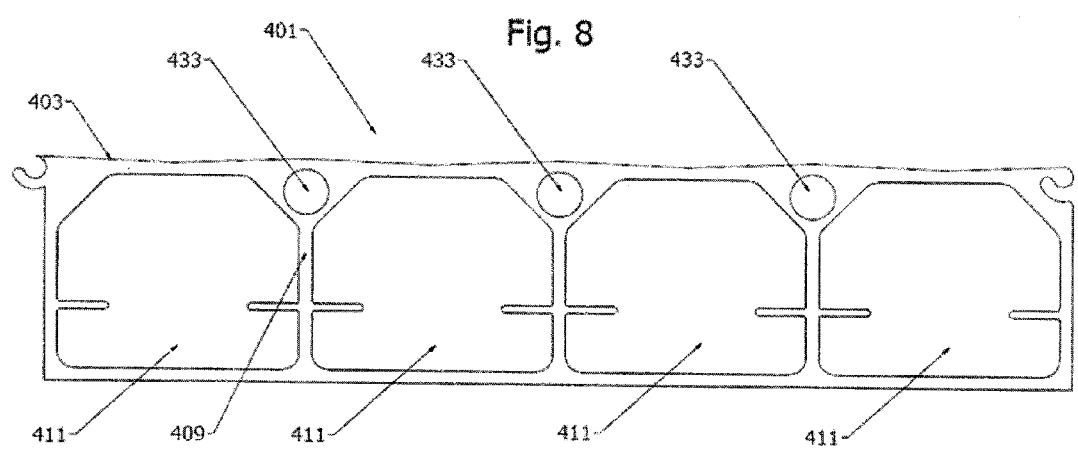

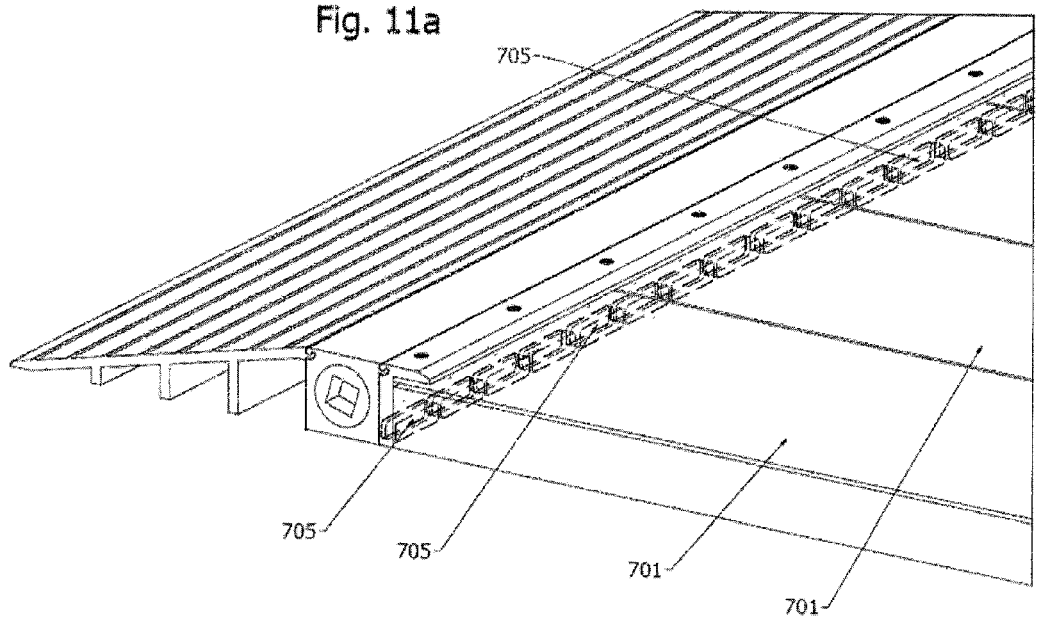
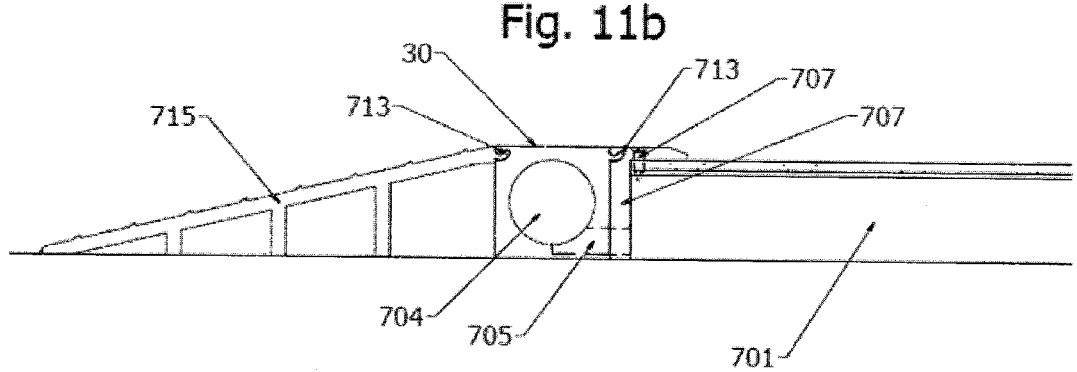

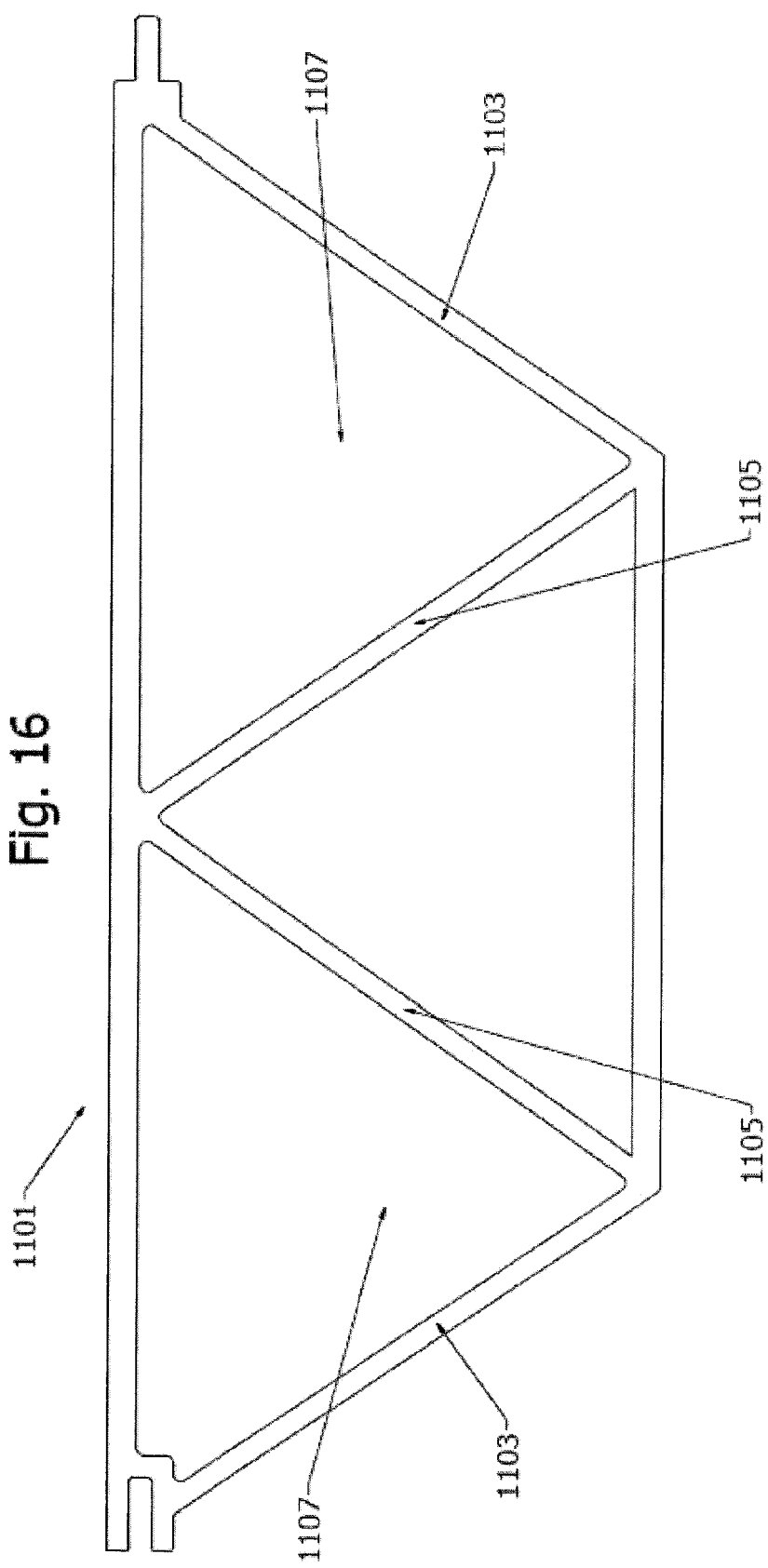

MODULAR FIRE PREVENTION FLOORING

CROSS-REFERENCE TO RELATED APPLICATIONS

This application is a non-provisional application which claims priority from U.S. provisional application No. 61/725,810, filed Nov. 13, 2012.

TECHNICAL FIELD/FIELD OF THE DISCLOSURE

The present disclosure relates generally to flooring panels, and more specifically to a modular flooring system capable of draining spilled flammable or combustible liquids and preventing their ignition.

BACKGROUND OF THE DISCLOSURE

In many facilities, fire prevention is a very important consideration. For facilities that are very expensive, such as oil rigs, refineries, chemical factories, offshore platforms, methanol storage tank storage platforms, or aircraft carriers, quickly controlling a fire may be imperative to prevent destruction of the facility or costly repairs. For facilities used to store expensive equipment, such as aircraft hangars, helipads, or other fueling bays, an uncontrolled fire may cause extremely expensive damage in very short order.

Because many of these facilities also contain flammable or combustible liquids such as fuel, the risk of a fire rapidly spreading as spilled fluid flows along the floor may be enormous. Although drainage systems may allow flammable or combustible fluids to be safely collected, they do nothing to prevent the fluid already on the floor from being ignited. For example, aircraft hangars typically have sloped floors, allowing any spilled fluids to drain or be washed into a trench drain, typically positioned at the hangar door. If fuel or another flammable or combustible liquid is spilled, although it will drain, upon ignition, the entire fuel-exposed floor area may ignite, spreading fire across large areas of the floor very quickly.

Simply speaking, an open-air fire requires three elements to be sustained. The so-called "fire triangle" requires fuel, oxygen, and heat to create and sustain a fire. The removal of any leg of the triangle will prevent a fire from burning. Typical fire suppression systems, such as those used in hangars and other facilities, seek to remove oxygen or heat from an already burning fire. Typical fire suppression systems may include foam fire suppression systems, water sprinklers, water deluge systems, etc. However, rather than preventing a fluid-fueled fire from spreading, such systems typically rely on engulfing any burning materials to stop their burning. However, as they are inherently retroactive, damage can be incurred before they are triggered. Fluid that has not yet ignited may easily spread across a floor before being ignited. Upon ignition, a large area may be quickly engulfed in flames. Furthermore, cleanup costs from a triggered foam suppression system as well as costs to recharge such a system may be great.

SUMMARY

The present disclosure provides for a modular fire prevention flooring system. The modular fire prevention flooring system may include a flooring plank, the flooring plank being a generally rectangular tube, the flooring plank having a top wall, bottom wall, and sidewalls, the interior of the flooring plank defining a drain channel, the top wall having a plurality of drain holes formed therein.

The present disclosure also provides for a modular fire prevention flooring system. The modular fire prevention flooring system may include a plurality of flooring planks, each flooring plank being a generally rectangular tube. Each flooring plank may include a top wall, the top wall having a plurality of holes formed therein, a bottom wall, sidewalls, a web extending between the bottom wall and the top wall along the length of the flooring plank, the web dividing the interior of the flooring plank into adjacent drain channels, the web defining a sidewall of each of the drain channels, a first coupler positioned on one sidewall, and a second coupler positioned on the other sidewall, the first coupler positioned to couple to the second coupler of a first adjacent flooring plank, and the second coupler positioned to couple to the first coupler of a second adjacent flooring plank.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIGS. 4a, 4b are cross section views of an attachment between adjacent fire prevention flooring panels of FIG. 2.

FIG. 7 is a perspective view of a fire prevention flooring panel consistent with embodiments of the present disclosure.

FIG. 8 is a cross section view of a fire prevention flooring panel consistent with embodiments of the present disclosure including cooling ducts.

FIG. 10b is a perspective view of a T-Bolt for use with the mounting feature of FIG. 10a.

FIG. 11a is a semi-transparent perspective view of a fire prevention flooring system including an inlet or drain manifold consistent with embodiments of the present disclosure.

FIG. 11b is a partial cross section view of the fire prevention flooring system of FIG. 11a.

FIG. 16 depicts a cross section view of a fire prevention flooring system consistent with embodiments of the present disclosure.

DETAILED DESCRIPTION

Figure 1:
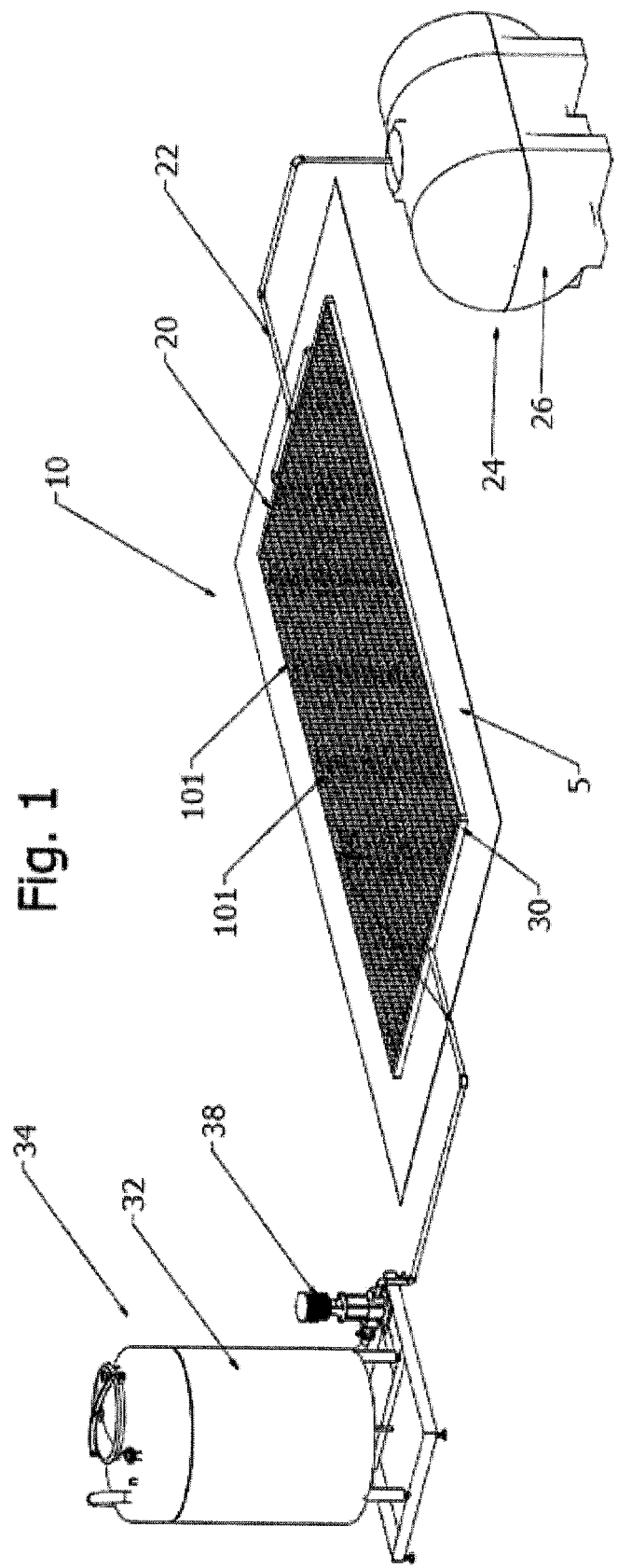
FIG. 1 is a block diagram of a modular fire prevention flooring system consistent with embodiments of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

In some embodiments of the present disclosure, a modular fire prevention flooring system 10, as depicted in FIG. 1, includes a plurality of flooring planks 101. Flooring planks 101 are placed on subsurface 5, and are arranged so that adjacent flooring planks 101 form a continuous upper surface. The continuous upper surface of modular fire prevention flooring system 10 may, in some embodiments, be used as, for example and without limitation, the floor of an aircraft hangar, fuel ramp, drilling rig platform, factory, chemical plant, fluid storage area, or any other facility in which potentially flammable or combustible liquids may be utilized.

Flooring planks 101, as discussed below, include a plurality of drain holes which allow a fluid spilled on the upper surface to flow into internal drain channels. In some embodiments, the drain channels are positioned to drain, for example, by gravity into drain manifold 20. In some embodiments, drain manifold 20 is coupled via drain pipe 22 to waste storage tank 24, where any drained fluids 26 may be collected for, for example, subsequent disposal. In some embodiments, waste storage tank 24 may include a suction pump (not shown) to, for example, assist with drainage of fluids from modular fire prevention flooring system 10. Although depicted as utilizing a single drain pipe 22 and waste storage tank 24, one having ordinary skill in the art with the benefit of this disclosure will understand that one or more of either may be utilized within the scope of this disclosure.

In some embodiments, modular fire prevention flooring system 10 may further include inlet manifold 30, positioned to flow purging fluid 32 through the drain channels of flooring planks 101. Purging fluid 32 may be a fluid capable of assisting with the drainage of any spilled fluids from modular fire prevention flooring system 10. In some embodiments, purging fluid 32 may be, for example and without limitation, water, a mixture of aqueous film forming foam, or any other foam based fire suppression chemical. Additionally, purging fluid 32 may further serve to cool flooring planks 101 when spilled fluids are flammable or combustible and actively burning. Purging fluid 32 may, in some embodiments, be stored in purging fluid storage tank 34 and be connected to inlet manifold 30 through supply pipe 36. In other embodiments, such as where water is used as purging fluid 32, supply pipe 36 may be connected directly to a water supply, such as a municipal water service.

In some embodiments, purging pump 38 may be positioned to, for example, increase flow of purging fluid 32 into the drain channels of flooring planks 101. Although depicted as utilizing a single purging fluid storage tank 34, supply pipe 36, and purging pump 38, one having ordinary skill in the art with the benefit of this disclosure will understand that any number of such components may be utilized within the scope of this disclosure. Furthermore, although not depicted, one or more valves may be positioned to allow or prevent purging fluid 32 from flowing into flooring planks 101. In some embodiments, the valves may be manually actuated. In other embodiments, the valves may be automatically actuated as, for instance, part of a fire control system.

Figure 2:
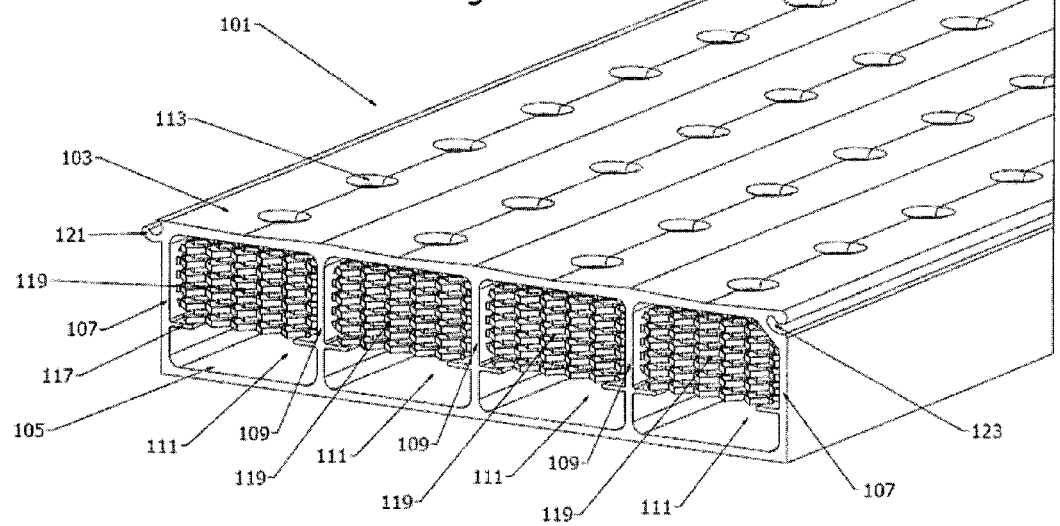
FIG. 2 is a perspective view of a modular fire prevention flooring system consistent with embodiments of the present disclosure.
Figure 3:
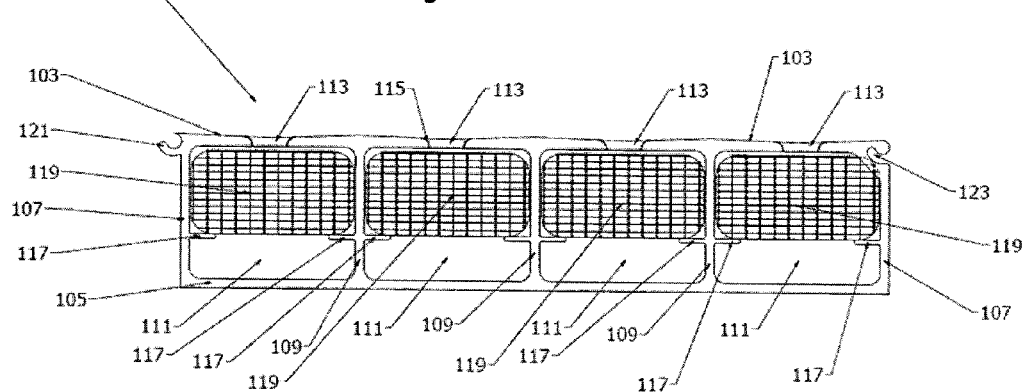
FIG. 3 is a cross section view of the fire prevention flooring panel of FIG. 2.
Figure 5:
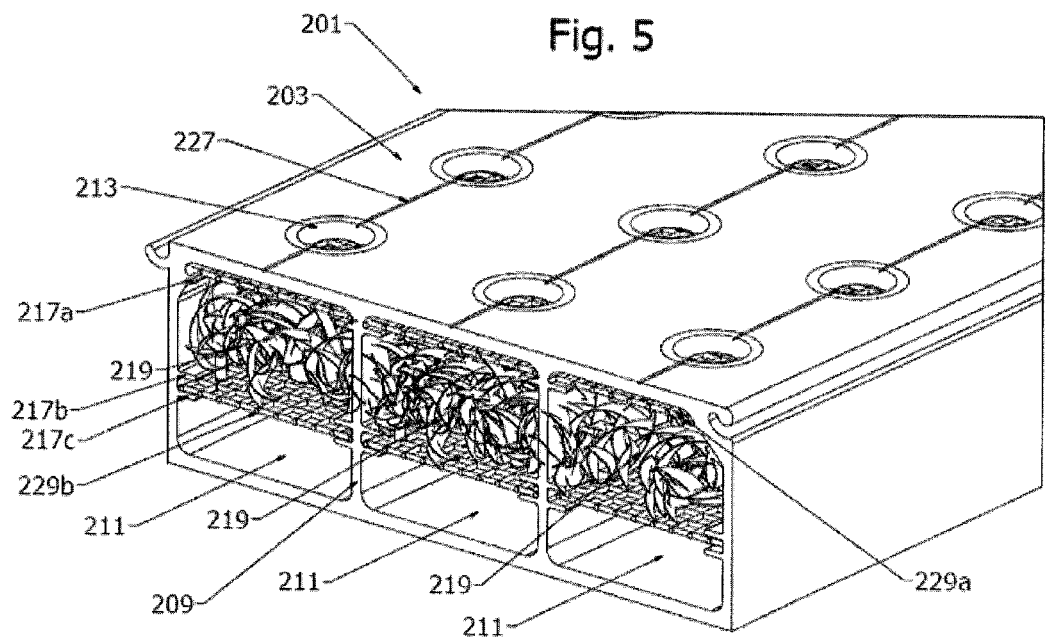
FIG. 5 is a perspective view of a modular fire prevention flooring panel consistent with embodiments of the present disclosure.

As depicted in FIGS. 2, 3, an exemplary flooring plank 101 includes upper surface 103, lower surface 105, and sidewalls 107. Upper surface 103 may be supported throughout the interior of flooring plank 101 by one or more upright webs 109. As depicted in FIGS. 2, 3, three webs 109 are positioned within flooring plank 101. One having ordinary skill in the art with the benefit of this disclosure will understand that any number of webs 109 may be positioned within flooring plank 101. For example, FIG. 5 depicts flooring plank 201 having two webs 209, and FIG. 7 depicts flooring plank 301 having only a single web 309. One having ordinary skill in the art with the benefit of this disclosure will further understand that webs 109 may likewise be omitted from the interior of flooring plank 101. Webs 109 may serve to increase the weight capacity of flooring plank 101.

Webs 109 may additionally divide flooring plank 101 into one or more interior areas, which form drain channels 111. Drain channels 111 run along the length of flooring plank 101. Fluid spilled onto upper surface 103 of flooring plank 101 drains into drain channels 111 via drain holes 113. By draining any flammable or combustible spilled fluids into drain channels 111, the spread of the fluids across the floor as previously discussed may be prevented.

In some embodiments, as depicted in FIGS. 2, 3, drain holes 113 are circular in cross-section. However, one having ordinary skill in the art with the benefit of this disclosure will understand that drain holes 113 may be formed having any suitable cross section, including without limitation a cross section which is circular, rectangular, oblong, elliptical, etc. In some embodiments, drain holes 113 may be formed with drainage profile 115 positioned to, for example, encourage drainage of fluids spilled on top surface 103. Additionally, drainage profile 115 may act as a funnel to, for example, increase the flow rate through drain holes 113. In some embodiments, as depicted in FIGS. 2, 3, drainage profile 115 may be formed with a rounded cross-section. In such embodiments, the radius of the rounded cross section of drainage profile 115 may have a significant impact on the drainage capacity of drain holes 113. One having ordinary skill in the art with the benefit of this disclosure will understand that drainage profile 115 may have other cross-sections including, for example, a chamfer or any other profile suitable for encouraging fluid drainage from upper surface 103. In some embodiments, such as that depicted in FIG. 2, drain holes 113 may be positioned in a square pattern. One having ordinary skill in the art with the benefit of this disclosure will understand that any arrangement of drain holes 113 may be utilized within the scope of this disclosure. For example, FIG. 7 depicts drain holes 313 arranged diagonally along upper surface 303 of flooring plank 301.

In some embodiments, metal filler 119 may be positioned within drain channels 111. Metal filler 119 is positioned such that fluid spilled onto upper surface 113, after passing through drain holes 113, flows through metal filler 119 when entering drain channels 111. Metal filler 119 is formed as a permeable, high-surface area, low density mass of metal.

Metal filler 119, may serve to separate any flammable or combustible fluids in drain channels 111 from oxygen at the surface of flooring plank 101 and thus help prevent their ignition. Furthermore, any fluid already burning when it flows into flooring plank 101 may be extinguished by metal filler 119. Metal filler 119 may, for example, separate the burning fluid into very small voids within the bulk of metal filler 119 which are too small for the fluid to burn within. Additionally, because metal has high heat conductivity, metal filler 119 may serve to rapidly remove heat from the flammable or combustible fluid and thus, for example, may bring the fluid below its flashpoint or its autoignition temperature. For flammable or combustible fluids having relatively high flash points or autoignition temperatures, metal filler 119 may passively cool the fluid below its autoignition temperature, thereby helping to alleviate the possibility of continued burning thereof. For fluids having relatively low autoignition temperatures, such as gasoline, metal filler 119 may serve to minimize the amount of oxygen which can reach the fluid within drain channel 111. In some embodiments, drain holes 113 may be positioned far enough apart that any resulting flame extending from one drain hole 113 may not ignite vapors from an adjacent drain hole 113. Fluid, once draining through metal filler 119 may then flow through drain channel 111 as previously discussed.

In some embodiments, such as depicted in FIGS. 2, 3, metal filler 119 may be formed from a metal "wool" formed from a perforated and expanded metal sheet. In some embodiments, sidewalls 107 and/or webs 109 may include one or more support flanges 117 extending generally horizontally into drain channels 111. Support flanges 117 may be positioned to support metal filler 119 above lower surface 105 while allowing fluid to flow into the bottom of drain channels 111, to prevent metal filler 119 from impeding the flow of any fluid within drain channels 111.

Figure 6:
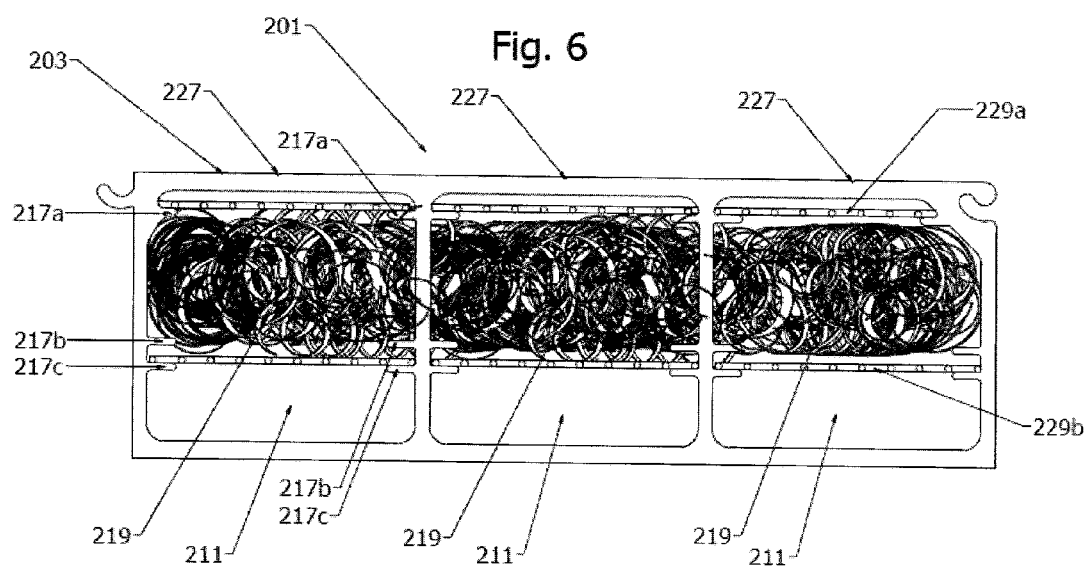
FIG. 6 is a cross section view of the modular fire prevention flooring panel of FIG. 5.

In other embodiments, such as that depicted in FIGS. 5, 6 discussed below, metal filler 219 may include metal shavings, chips, fragments, wires, and/or cuttings. In some embodiments, as depicted in FIGS. 5, 6, flooring plank 201 may include metal filler 219 formed from metal shavings. Because metal shavings, unlike the metal wool previously described, may, for example, be smaller than drain holes 213, and might be washed down drain channels 211 along with any fluid, upper and lower meshes 229a, 229b respectively may be included in flooring plank 201 to contain metal filler 219. In some embodiments, support flanges 217a, 217b, 217c may be positioned to extend from sidewalls 207 or webs 209 to support upper and lower meshes 229a, 229b. In some embodiments, upper support flanges 217a may be positioned to retain upper mesh 229a in a position between upper support flanges 217a and upper surface 203. In some embodiments, one or more lower flanges 217b, 217c may be positioned to support and/or retain lower mesh 229b above the bottom of drain channel 211. As understood in the art, upper and lower meshes 229a, 229b may be formed from a wire screen having openings small enough to prevent, for example, individual shavings of metal filler 219 from, in the case of upper mesh 229a, being pulled through drain holes 213, or, in the case of lower mesh 229b, from being washed down drain channel 211.

In some embodiments, such as that depicted in FIG. 7, drain channels 311 may include one or more ribs 331 positioned on the lower surface of drain channels 311 running parallel to drain channels 311. Ribs 331 may serve to, for example, space a metal filler (not shown) from the bottom of drain channels 311 to prevent the metal filler from impeding fluid flow within drain channels 311. In such an embodiment, no support flanges need extend from sidewalls 307 nor web 309.

In some embodiments, such as that depicted in FIGS. 2, 3, upper surface 103 may be contoured so that fluid is biased to flow into drain holes 113. As can be seen in FIG. 3, upper surface 103 has a continuously curved profile to promote fluid drainage toward drain holes 113. One having ordinary skill in the art with the benefit of this disclosure will understand that upper surface 103 may have any contour suitable for biasing fluid to drain into drain holes 113 without deviating from the scope of this disclosure.

In some embodiments, such as that depicted in FIGS. 5, 6, upper surface 203 of flooring plank 201 may include one or more surface tension features likewise positioned to promote fluid flow to drain holes 213. In some embodiments, the surface tension feature may include groove 227 formed in upper surface 203 and intersecting drain holes 213. Groove 227 may serve to, for example, draw fluid on upper surface 203 into drain holes 213 by capillary action. One having ordinary skill in the art with the benefit of this disclosure will understand that other surface tension features, such as surface textures, surface finishes, surface coatings, etc. may likewise be used in any embodiment of the present disclosure without deviating from the scope thereof.

In some embodiments, flooring planks 101 include coupling features 121, 123 positioned to allow adjacent flooring planks to interconnect. In some embodiments, such as that depicted in FIGS. 4a, groove 121a on first flooring plank 101 may be positioned to receive tongue 123a from a second flooring plank 101'. In this embodiment, tongue 123a has a curved profile. To attach second flooring plank 101' to first flooring plank 101 already in position, the curvature of tongue 123a may allow second flooring plank 101' to lock to first flooring plank 101 through a downwardly pivoting movement. Additionally, groove 121a may include a seal 125 positioned to be compressed by tongue 123a as tongue 123a locks into groove 121a. Seal 125 may, for example, prevent a fluid spilled on upper surface 103 from flowing between adjacent flooring planks 101, 101'. In other embodiments, a tongue and groove system may instead extend horizontally, allowing adjacent flooring planks to be coupled through a purely horizontal movement. In other embodiments, such as that depicted in FIG. 4b, tongue 123b may be "L" shaped, and vertically couple to groove 121b, allowing adjacent flooring planks to be coupled through a purely vertical movement.

In some embodiments, such as depicted in FIG. 8, flooring plank 401 may further include one or more cooling ducts 433. Cooling ducts 433, formed in flooring plank 401, may be positioned to cool flooring plank 401 while a burning fluid is drained thereinto. Cooling ducts 433 may thus increase the effectiveness of the metal filler (not shown) in its ability to remove heat from the fluid. In some embodiments, cooling ducts 433 are formed as a part of webs 409 and may thus cool adjacent drain channels 411. In some embodiments, cooling ducts 433 are positioned near upper surface 403 to help cool upper surface 403 to, for example, prevent fluid still on upper surface 403 from continuing to burn.

Figure 9:
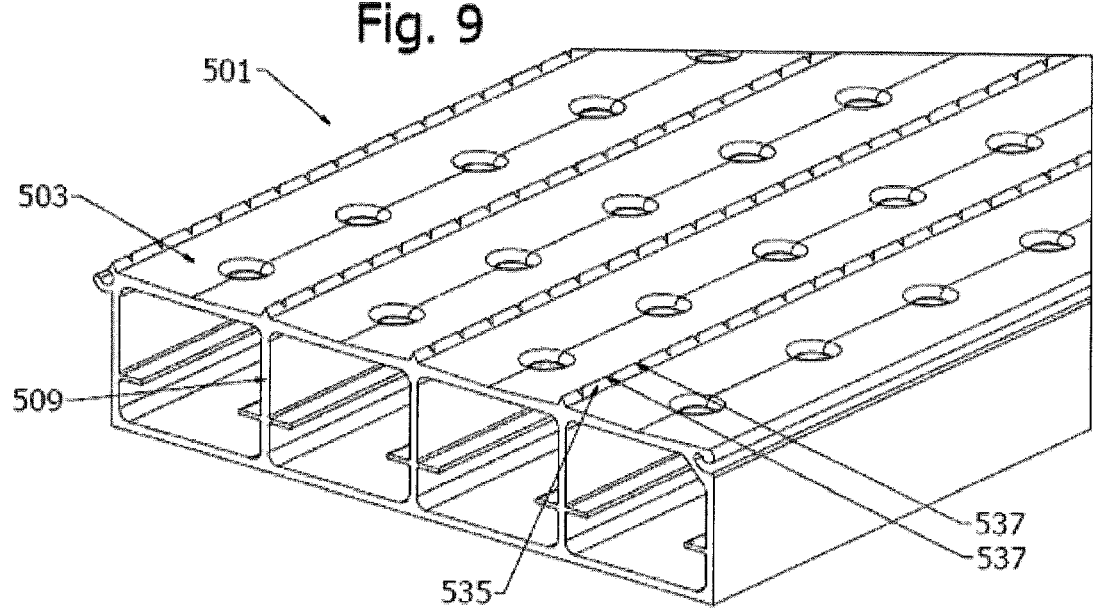
FIG. 9 is a perspective view of a fire prevention flooring panel consistent with embodiments of the present disclosure having a non-slip surface feature.

In some embodiments, such as depicted in FIG. 9, flooring plank 501 may include a non-slip feature on upper surface 503. For example, in some embodiments one or more non-slip ridges 535 may be formed on upper surface 503. Here depicted as triangular in cross section, non-slip ridges 535 extend upward from upper surface 503 and may, for example, increase traction for a vehicle or person standing on flooring plank 501. In some embodiments, non-slip ridges 535 may further include notches 537 formed thereinto to further increase traction. Non-slip ridges 535 may further serve to inhibit the spread of a spilled fluid across upper surfaces 503 of adjacent flooring planks 501.

With regard to FIG. 1, in some embodiments, flooring planks 101 may be secured to floor 5 directly by using fasteners between flooring planks 101 and floor 5. For example, flooring planks 101 may be secured to floor 5 using threaded fasteners such as screws or bolts extending through a portion of flooring planks 101 into floor 5. In other embodiments, the weight of the assembled flooring planks 101 and any equipment placed thereon may be sufficient to ensure stability.

Figure 10A:
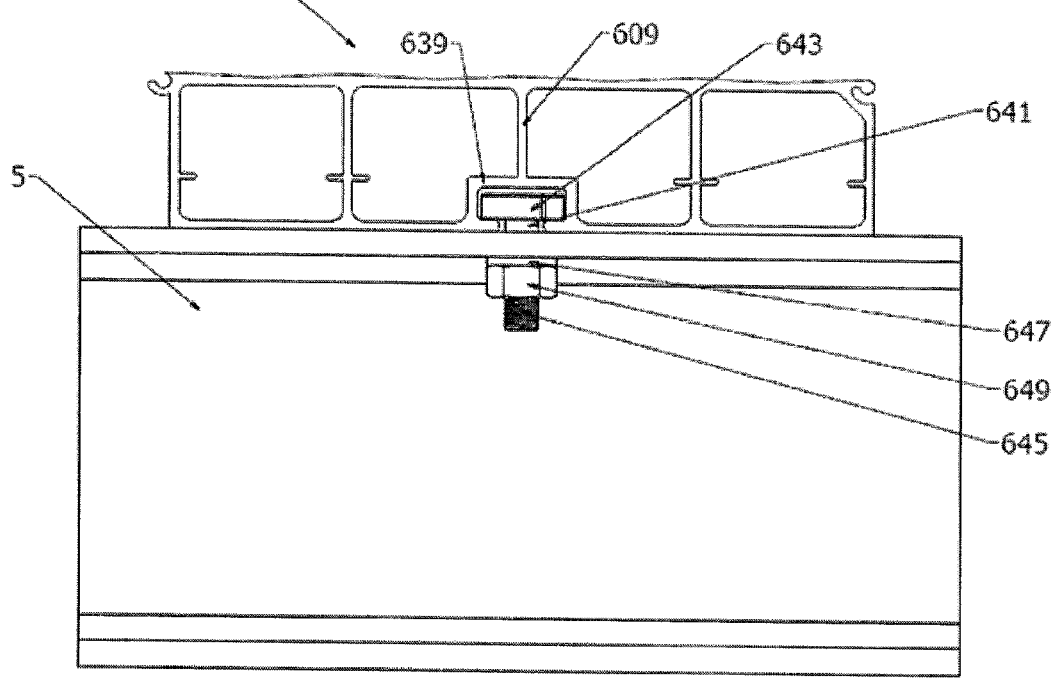
FIG. 10a is a cross section view of a fire prevention flooring panel consistent with embodiments of the present disclosure having a mounting feature included therein.
Figure 10B:
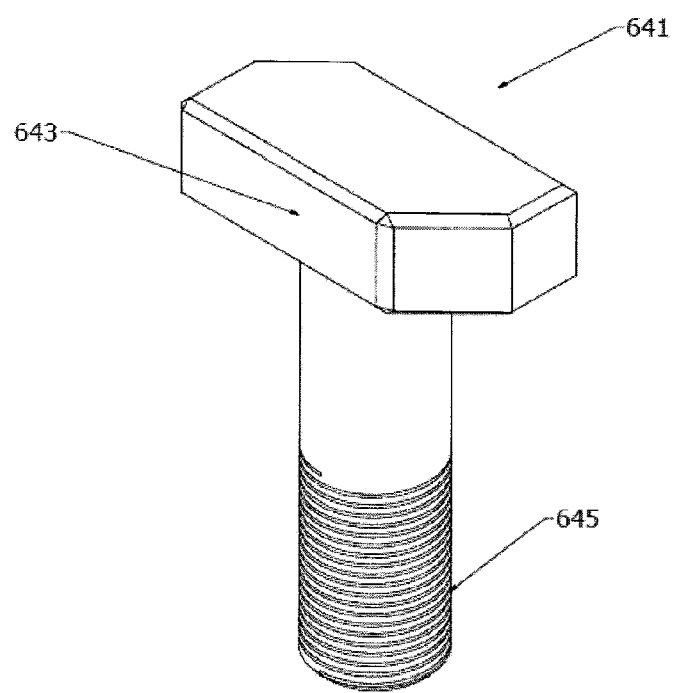

In some embodiments, such as that depicted in FIG. 10a, locking flooring plank 601 may include slot 639 positioned to accept the head of a threaded member such as a bolt. In some embodiments, the threaded member may be T-Bolt 641. As depicted in FIG. 10b, T-Bolt 641 includes bolt head 643 and threaded shank 645. Bolt head 643 is generally rectangular in cross section. The width of slot 639 is chosen to be wider than the narrower width of bolt head 643, but narrower than the wider width of bolt head 643. Thus, to install locking flooring plank 601, bolt head 643 may be slipped into slot 639 and rotated 90 degrees. Nut 649 is then threaded onto threaded shank 645 and tightened to secure locking flooring plank 601 to floor 5. In some embodiments, washer 647 may be included to, for example, spread the compressive load from T-Bolt 641 across a wider portion of floor 5. In some embodiments, one or more locking flooring planks are included in flooring planks 101 as depicted in FIG. 1, ensuring flooring planks 101 do not move about floor 5.

In some embodiments, the underside of each flooring plank may include features to prevent movement across the floor, including without limitation, ridges, feet, or patterns configured to interlock with the floor surface onto which the planks are to be placed.

Drain and inlet manifolds 20, 30 may be coupled to the ends of flooring planks 101 such that the ends of the drain channels of flooring planks 101 are open to the interior of drain and inlet manifolds 20, 30. FIGS. 11a, 11b depict an inlet or drain manifold consistent with embodiments of the present disclosure. For purposes of the following discussion, the manifold will be described as inlet manifold 30. As depicted, inlet manifold 30 is coupled to flooring planks 701. Inlet manifold 30 includes an inlet port 703 positioned to receive purging fluid from the purging fluid supply tank (See FIG. 1.). In a purging operation, purging fluid enters interior 704 of inlet manifold 30, and flows through apertures 705 aligned with the drain channels of flooring planks 701. Purging fluid flows through drain channels and serves to, for example, wash any spilled fluid out of flooring planks 701. Purging fluid may also, for example, clean any spilled fluid out of the metal filler. Additionally, purging fluid may serve to cool flooring planks 701 during and after a fire. Because purging fluid remains within the drain channels of flooring planks 701, purging fluid does not flow on the surface of flooring planks 701, allowing a person to remain standing on flooring planks 701 without being affected by the purging operation by, for example, flooring planks 701 becoming slippery, flammable or combustible fluid being washed onto the person, etc.

Figure 12:
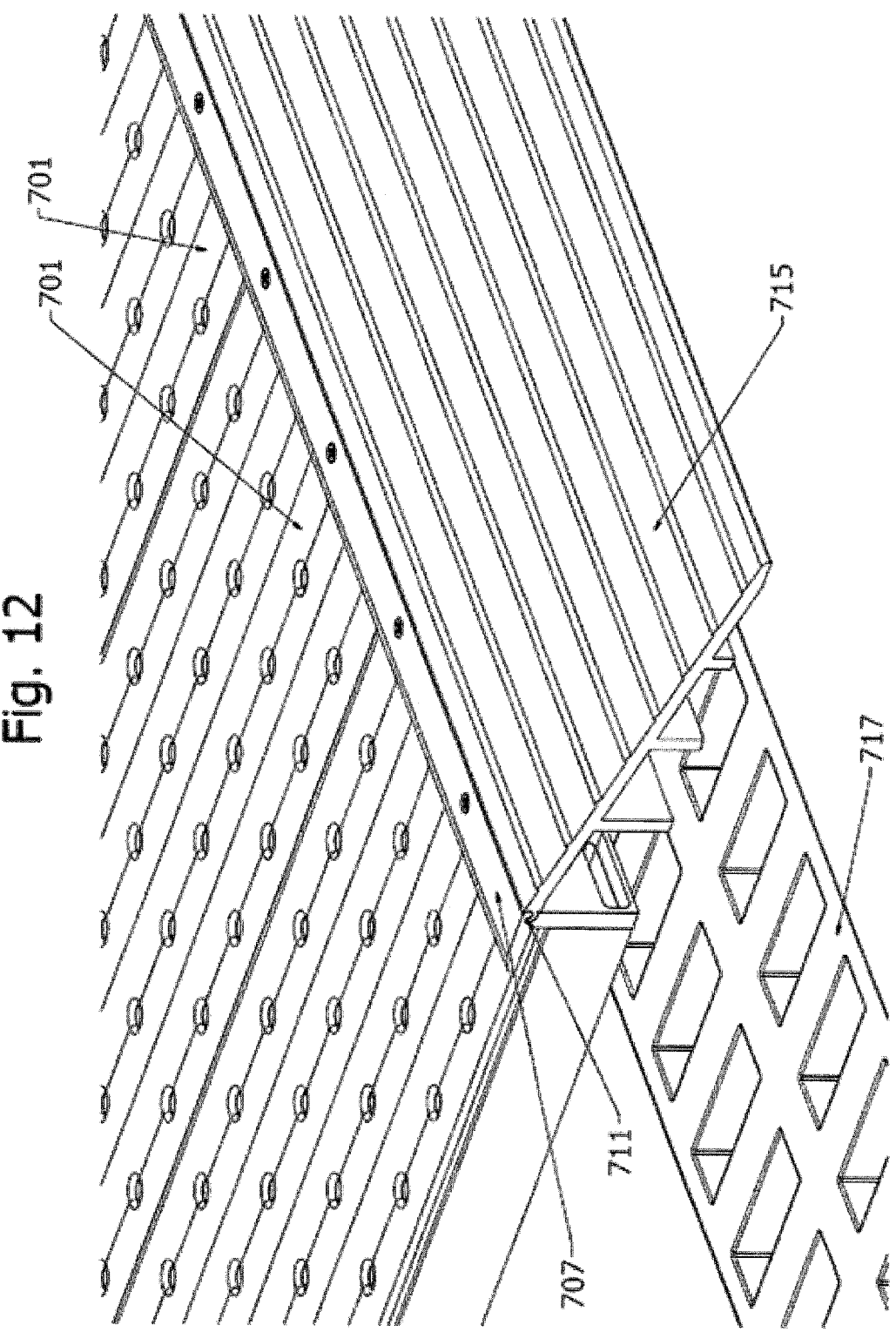
FIG. 12 is a perspective view of a fire prevention flooring system consistent with embodiments of the present disclosure including a ramp.

In some embodiments, inlet manifold 30 is coupled to flooring planks 701 by end coupler 707. End coupler 707 may be coupled to flooring planks 701 by any suitable means, including by threaded connectors such as bolts 709 as depicted in FIGS. 11a, 11b. In some embodiments, end coupler 707 may couple to inlet manifold 30 via a tongue and groove coupler 711 as discussed above. In some embodiments, a seal (not shown) may be placed between one or more of inlet manifold 30, end coupler 707 and flooring planks 701. In some embodiments, inlet manifold 30 may also include auxiliary tongue and groove coupler 713 at the opposite side from flooring planks. Auxiliary tongue and groove coupler 713 may, in some embodiments, be used to couple another modular unit to inlet manifold 30. The modular unit may include a second inlet or drain manifold (not shown) back to back with inlet manifold 30. In other embodiments, as shown in FIGS. 11a, 11b, the modular unit may include access ramp 715 positioned to, for example, allow a vehicle to roll smoothly onto flooring planks 701. In some embodiments, such as depicted in FIG. 12, end coupler 707 may be used to couple flooring planks 701 directly to access ramp 715. In such an embodiment, the drain channels of flooring planks 701 may drain directly into trench drain 717. As tongue and groove coupler 711 may be the same for all components in the system, one having ordinary skill in the art with the benefit of this disclosure will understand that any configuration of modular components may be constructed within the scope of this disclosure.

Figure 13:
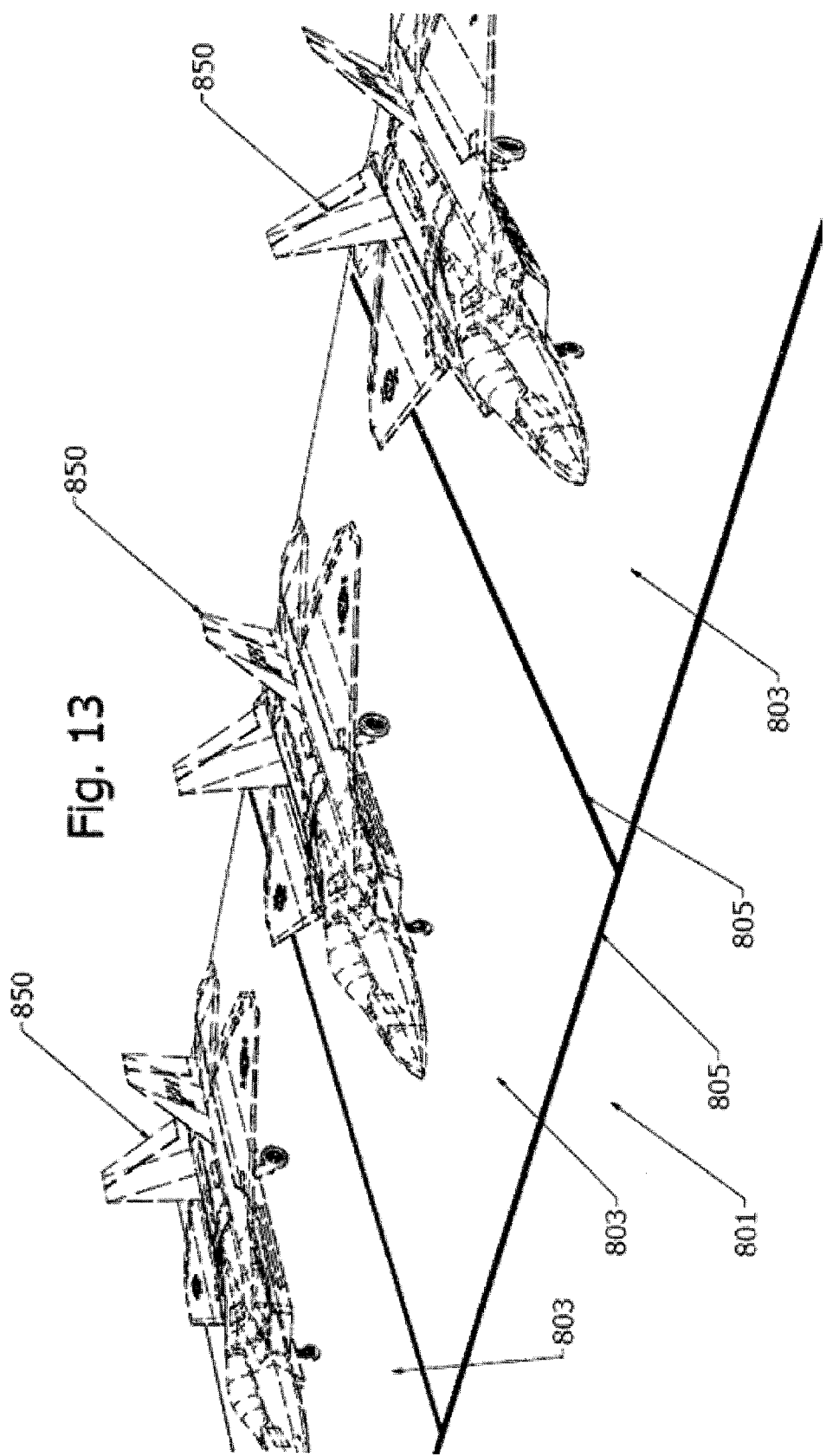
FIGS. 13-15 depict embodiments of a fire prevention flooring system consistent with embodiments of the present disclosure.

Furthermore, because flooring planks 701 may be formed in any length, and placed side by side in any reasonable number, a plurality of different configurations may be constructed tailored to the specific needs of the installation. For example, FIG. 13 depicts a modular fire prevention flooring system 801 including adjacent flooring sections 803. Each flooring section 803 may include a plurality of parallel flooring planks as previously discussed (not shown for clarity) draining into a common trench drain 805. In some embodiments, each flooring section 803 may be used as a separate parking or fueling ramp for a vehicle, here depicted as fighter jets 850. Modular fire prevention flooring system 801 may be located, for example and without limitation, on an airport apron, in a permanent or temporary hangar, on the deck or hangar area of an aircraft carrier, on a helipad, etc.

In other embodiments, two adjacent flooring sections 803 may be positioned to drain into a common trench drain running between them. In some embodiments having such an arrangement, other interfaces between adjacent flooring sections 803 may instead have back-to-back inlet manifolds. In other embodiments, a common inlet manifold may be included to purge adjacent flooring sections 803.

Each flooring section 803 may include a separate valved connection to a supply of purge fluid, and may thus be independently purged. In some embodiments, separately purging only a flooring section 803 having an active spill situation may allow for maximal purging fluid flow therethrough, where purging all flooring sections 803 simultaneously may result in insufficient fluid for purging. In some embodiments, flooring sections 803 may be further divided into independently purgeable subsections, allowing further concentration of purging fluid flow. In some embodiments, flooring sections 803 may be routinely purged to, for example, purge any residual or small scale fluid spills thereinto even when a large scale spill or ignited spill has not occurred.

Figure 14:
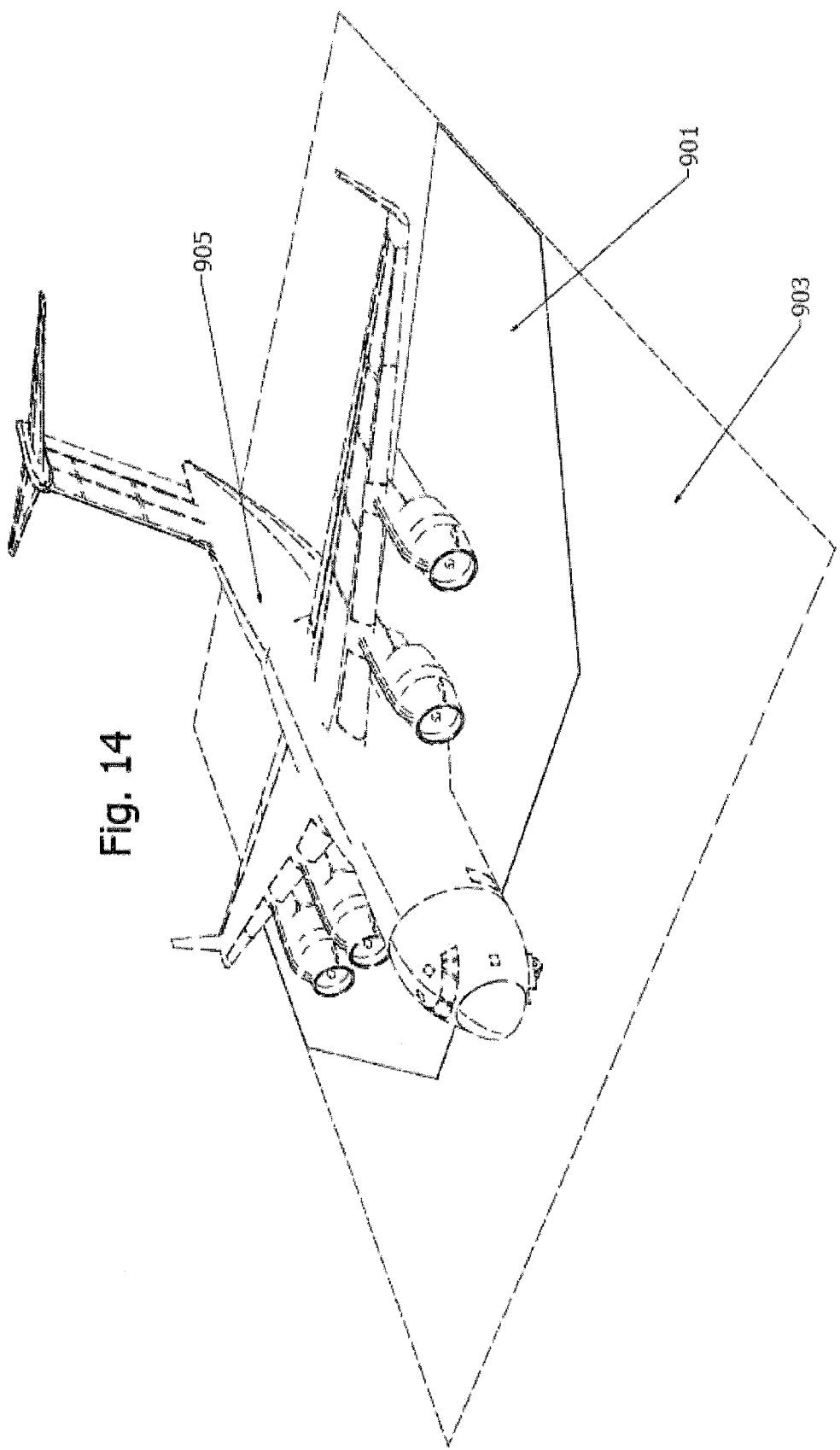

In some embodiments, a modular fire prevention flooring system may be formed as an integrated part of the floor itself. For example, FIG. 14 depicts modular fire prevention flooring system 901 as sunk into and level with the surface of floor 903. Floor 903 may, for example and without limitation, be a concrete slab floor in an aircraft hangar or may be a concrete or tarmac floor of an airport apron. In such an arrangement, no ramps would be necessary to allow vehicles to be on top of modular fire prevention flooring system 901. Furthermore, by tailoring modular fire prevention flooring system 901 to a specific need, such as, for example and without limitation, a fueling ramp located under the wings of a large aircraft such as cargo aircraft 905, the costs and materials of installing modular fire prevention flooring system 901 may be minimized while spill sensitive areas, such as underneath fuel filling ports in the example of FIG. 14, are still covered.

Figure 15:
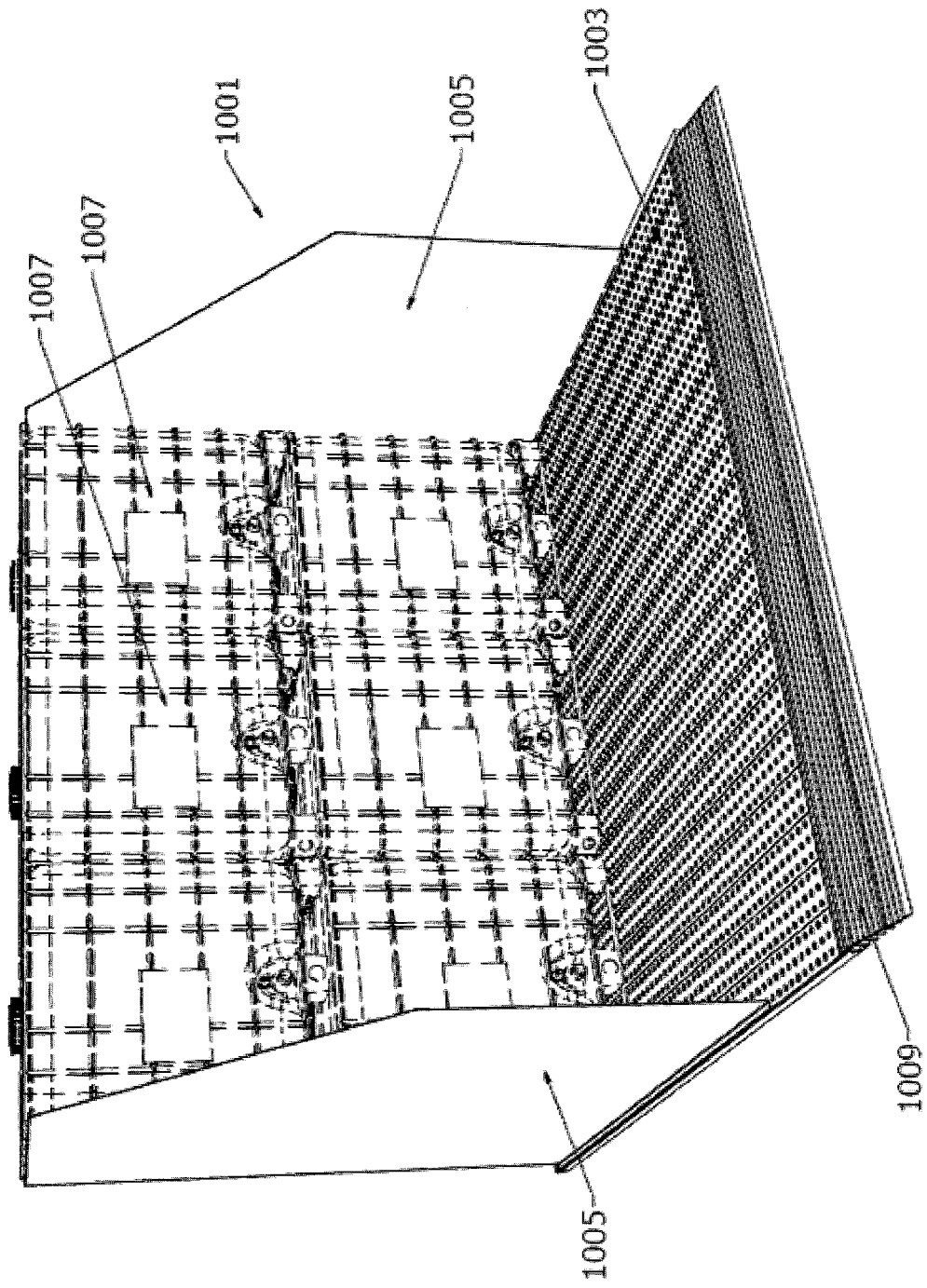

In other embodiments, a modular fire prevention flooring system may be used as a part of a chemical storage depot. As depicted in FIG. 15, chemical storage depot 1001 may include a modular fire prevention flooring system 1003. Modular fire prevention flooring system 1003 may include one or more shield walls 1005 or back walls (not shown) positioned to, for example, shield chemical storage containers 1007 from the side, prevent chemical storage containers 1007 (such as IBC tote containers, methanol storage tanks, etc.) from toppling, and containing any spills from chemical storage containers 1007 within modular fire prevention flooring system 1003. In some embodiments, ramp 1009 may be included to, for example, allow a vehicle such as a forklift access to chemical storage containers 1007.

In some embodiments, with reference to FIG. 1, one or more of flooring planks 101, drain manifold 20, inlet manifold 30, and access ramp (as previously discussed) may be formed by extrusion as understood in the art. To manufacture any such component, metal is forced through a forming die which corresponds to the cross section of the component including, for example, surface contours, anti-slip ridges, cooling channels, support flanges, mounting channels, and/or grooves as desired. In order to form the transverse notches such as in FIG. 9, a roller may, in some embodiments, be positioned to hot form the component as it is extruded. As such, each member may be formed in any length practical for transport to the installation site. Drain holes may, in some embodiments, be formed by drilling, milling, trepanning, or any other method known in the art to form and finish a hole through the upper surface of the flooring plank.

Furthermore, although discussed throughout as having a generally rectangular cross section, one having ordinary skill in the art with the benefit of this disclosure will understand that the profile of the drain channels in the flooring planks need not be rectangular. For example, FIG. 16 depicts a flooring plank 1101 having tapered sidewalls 1103 and tapered webs 1105. Drain channels 1107 are thus triangular in cross section. One having ordinary skill in the art with the benefit of this disclosure will understand that drain channels may be rounded, triangular, or any other profile without deviating from the scope of this disclosure.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions and alterations herein without departing from the spirit and scope of the present disclosure.

The invention claimed is:

1. A modular fire prevention flooring system comprising:
a flooring plank, the flooring plank being a generally rectangular tube, the flooring plank having a top wall, bottom wall, and sidewalls, an interior of the flooring plank defining a drain channel, the top wall having a plurality of drain holes formed therein;
a metal filler positioned within the drain channel; and
one or more support flanges extending from at least one of the sidewalls into the drain channel, the support flanges positioned to support the metal filler above the bottom wall of the drain channel.

2. The modular fire prevention flooring system of claim 1, wherein the flooring plank further comprises a web extending between the bottom wall and the top wall along the length of the flooring plank, the web dividing the interior of the flooring plank into two adjacent drain channels, the web defining an additional sidewall of each of the drain channels.

3. The modular fire prevention flooring system of claim 2, further comprising a ramp coupled to a flooring plank of the plurality of flooring planks.

4. The modular fire prevention flooring system of claim 1, wherein the metal filler comprises an expanded perforated metal sheet.

5. The modular fire prevention flooring system of claim 1, wherein the metal filler comprises a collection of one or more of metal shavings, cuttings, wires, fragments and/or chips.

6. The modular fire prevention flooring system of claim 5, wherein the metal filler further comprises a containment mesh positioned to prevent individual parts of the metal filler from separating from the bulk of the metal filler.

7. The modular fire prevention flooring system of claim 1, wherein the drain holes further comprise a drainage profile on an upper surface of the top wall of the flooring plank.

8. The modular fire prevention flooring system of claim 1, wherein a drain hole of the plurality of drain holes has a cross section selected from circular, rectangular, oblong, or elliptical.

9. The modular fire prevention flooring system of claim 1, wherein an upper surface of the top wall of the flooring plank comprises a contour positioned to encourage a fluid placed on the upper surface to flow into the drain holes.

10. The modular fire prevention flooring system of claim 1, wherein an upper surface of the top wall of the flooring plank comprises a groove, the groove positioned to intersect a drain hole and encourage fluid flow into the drain hole.

11. The modular fire prevention flooring system of claim 1, wherein the bottom wall of the flooring plank further comprises a slot, the slot positioned to accept a head of a fastener to secure the flooring plank to a floor beneath the flooring plank.

12. The modular fire prevention flooring system of claim 11, wherein the fastener comprises a TBolt.

13. The modular fire prevention flooring system of claim 1, wherein the flooring plank further comprises a cooling duct formed therein.

14. The modular fire prevention flooring system of claim 1, wherein an upper surface of the top wall of the flooring plank comprises an upwardly extending ridge.

15. The modular fire prevention flooring system of claim 14, wherein the ridge further comprises a plurality of notches positioned to increase grip provided by the ridge.

16. The modular fire prevention flooring system of claim 1, wherein a plurality of the flooring planks are positioned on a floor so that the sidewalls of adjacent flooring planks abut.

17. The modular fire prevention flooring system of claim 16, further comprising:
a manifold, the manifold being a generally tubular member coupled to one end of each of the plurality of flooring planks, the manifold having a port coupled to an interior of the manifold, the interior of the manifold coupled to the drain channel of each of the plurality of flooring planks so that fluid may flow between the port and the drain channels of each of the plurality of flooring planks via the manifold.

18. The modular fire prevention flooring system of claim 17, wherein the manifold defines an inlet manifold, the inlet manifold positioned to receive a flow of a purging fluid from a supply pipe coupled to the port and positioned to supply the purging fluid to the drain channel of each of the plurality of flooring planks.

19. The modular fire prevention flooring system of claim 18, further comprising a purging fluid storage tank coupled to the supply pipe.

20. The modular fire prevention flooring system of claim 18, further comprising a purging pump coupled to the supply pipe, the purging pump positioned to increase the flow of the purging fluid to the inlet manifold.

21. The modular fire prevention flooring system of claim 17, wherein the manifold defines a drain manifold, the port coupled to a drain pipe, the drain pipe positioned to receive a flow of fluid from the drain channels via the drain manifold.

22. The modular fire prevention flooring system of claim 21, further comprising a waste storage tank coupled to the drain pipe.

23. The modular fire prevention flooring system of claim 21, further comprising a suction pump coupled to the drain pipe, the suction pump positioned to increase the flow of the fluid from the drain channels.

24. The modular fire prevention flooring system of claim 16, wherein each of the flooring planks further comprises a first coupler and second coupler, the first and second couplers positioned on opposite sidewalls, the first and second couplers positioned to interlock with the second and first couplers respectively of the adjacent flooring planks.

25. The modular fire prevention flooring system of claim 24, wherein the first coupler comprises a male coupler and the second coupler comprises a female coupler, the female coupler adapted to receive the male coupler.

26. The modular fire prevention flooring system of claim 25, wherein the female coupler further comprises a seal.

27. The modular fire prevention flooring system of claim 25, wherein the male coupler has an upward curve so that adjacent flooring planks may be coupled together by a downward rotational movement of one or more of the flooring planks.

28. The modular fire prevention flooring system of claim 16, wherein the plurality of flooring planks is positioned on a floor surface having a slope so that one end of the drain channel of a flooring plank of the plurality of flooring planks is lower than the other end of the drain channel.

29. The modular fire prevention flooring system of claim 16, wherein the plurality of flooring planks is positioned in a depression in a floor surface, such that at least a portion of the floor surface is level with an upper surface of at least a portion of the plurality of flooring planks.

30. The modular fire prevention flooring system of claim 16, further comprising a shield wall coupled to a perimeter of the plurality of flooring planks, the shield wall extending vertically upward form an upper surface of the plurality of flooring planks.

31. The modular fire prevention flooring system of claim 16, wherein the plurality of flooring planks forms at least a part of one of a floor of an airport apron, a permanent or temporary hangar, a flight deck or hangar area of an aircraft carrier, an oil rig, a refinery, a chemical storage plant, IBC tote container storage area, under a methanol storage tank, a drill floor of an oil rig, a fracing site for natural gas, or a fuel ramp.

32. A modular fire prevention flooring system comprising:
   a plurality of flooring planks, each flooring plank being a generally rectangular tube, the flooring plank including:
      a top wall, the top wall having a plurality of holes formed therein,
      bottom wall,
      sidewalls,
      a web extending between the bottom wall and the top wall along the length of the flooring plank, the web dividing an interior of the flooring plank into adjacent drain channels,
      the web defining a sidewall of each of the drain channels,
      a metal filler positioned within at least one drain channel,
      one or more support flanges extending from at least one sidewall into the at least one drain channel, each support flange positioned to support the metal filler above a bottom of the drain channel,
      a first coupler positioned on one sidewall, and
      a second coupler positioned on the other sidewall, the first coupler positioned to couple to the second coupler of a first adjacent flooring plank, and the second coupler positioned to couple to the first coupler of a second adjacent flooring plank.

33. A modular fire prevention flooring system comprising:
   a flooring plank, the flooring plank being a generally rectangular tube, the flooring plank having a top wall, bottom wall, and sidewalls, an interior of the flooring plank defining a drain channel, the top wall having a plurality of drain holes formed therein;
   a metal filler positioned within the drain channel; and
   a rib positioned on an upper surface of the bottom wall and extending into the drain channel, the rib positioned to support the metal filler above the bottom wall of the drain channel.

* * * * *